Figure 1:
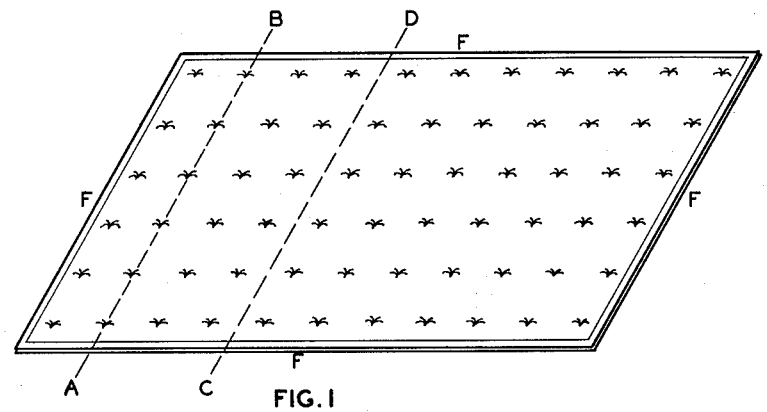

July 23, 1963     H. B. SKEES     3,098,563

INFLATABLE HEAT INSULATING MATERIAL

Filed Oct. 3, 1960

Hugh B. Skees
INVENTOR

BY _____
ATTORNEY

United States Patent Office 3,098,563
Patented July 23, 1963

3,098,563
INFLATABLE HEAT INSULATING MATERIAL
Hugh B. Skees, 10514 Sonata Drive, Affton, Mo.
Filed Oct. 3, 1960, Ser. No. 60,220
5 Claims. (Cl. 206—46)

This is a continuation-in-part of my co-pending application, Serial No. 748,455, filed on July 14, 1958, and entitled "Insulating Material for Prevention of the Transfer of Heat." The heat insulating system described therein is effective and very useful, providing a heat barrier which is both economical and practical for various applications including insulation of frozen foods against thawing, and for use as the insulating part of articles of clothing. Certain improvements on the above-mentioned invention have been discovered which make this heat insulation system even more valuable. These improvements are brought forth in this invention.

It has long been known that a dead-air space provides insulation against heat transfer. This principle is used in a very large number of heat insulating materials, including fibers, pulp and microcellular foams, etc. These materials all depend upon pockets of entrapped air or other gas which is prevented from circulating by its being enclosed in a confined space, thus preventing the transfer of heat by convection.

There are many types of materials for which it is desirable to provide a heat-insulating package. This invention is especially useful in providing a heat insulating package for frozen foods and for hot foods which are to be transported or otherwise kept for short periods before being consumed. An example of the latter is "carry out" foods which are sold by various types of restaurants. If these foods are not provided with a heat-insulating package, they will become too cool to retain their best flavor where there is a delay of more than a few minutes between their preparation and consumption.

This invention has three characteristics which make it especially useful and valuable. It is inexpensive, light weight, and it embodies the feature of retaining a small volume and slight heat insulation properties until the appropriate moment when heat insulation is needed. The method by which these characteristics are achieved will become clear as the invention is described.

One of the problems regarding the use of frozen foods which has existed since this means of food preservation was discovered, and which has never been adequately solved, is that frozen food cannot be exposed to ordinary temperatures for more than several minutes without beginning to thaw. Since it is essential to the best quality and flavor of these foods that they must not be allowed to thaw until they are ready for use, they must be protected against heat absorption by some type of insulating heat barrier if they are to be exposed to temperatures higher than 32° F. No practical and economical method of achieving this has ever been discovered until now. The most obvious and frequently observed aspect of this problem is encountered when a consumer buys frozen foods at a grocery store. He must hurry home with his purchase and put it in a freezer to prevent its thawing, thus allowing no time for other shopping, etc. In addition, since cold objects condense moisture from the air, these articles become wet in the shopping bag and may cause tearing of the paper bag and thus cause spillage of all the items therein.

It is an object of the present invention to provide an inflatable heat barrier composed of at least two relatively thin sheets or films of material non-permeable to gases which are sealed to each other in such a way that they confine a layer of air or other gas between them; the insulating effect being achieved by the layer of confined gas.

It is a further object of this invention to provide an inflatable heat barrier as described above which can remain in a deflated, non-insulating state until a predetermined time or temperature is reached.

Another object of this invention is to provide the above type heat barrier which is inflated by the vaporization of a liquid of a certain chosen boiling point, confined between the films or sheets. When this liquid is allowed to warm up to its boiling point it evaporates and inflates the space between walls.

Another object of this invention is to provide a heat barrier of the inflatable type which is inflated by a gas produced by the chemical reaction of two or more liquids or solids confined between the films or sheets.

A further object of this invention is to provide a heat insulating package for foods, either hot or cold, which remains deflated until its heat insulation property is needed.

Other objects of this invention will be made clear by the following description of its construction and operation.

The heat insulating material which this invention discloses consists in its essential features of a multiple walled sheet which has the space between the walls inflated with a gas. The walls of the sheet are preferably a thermoplastic film, and are so constructed and fabricated in relation to each other that the degree of expansion due to inflation is limited to a practical degree. As a practical description of the material of this invention, the following method of construction is given. Two sheets of plastic film are laid one on top of the other so that their edges coincide, and are sealed together at their edges by a gas-tight seal, preferably by application of heat. They may also be sealed together according to a pattern of points or lines over their common area, such that upon inflation of the space between them, one continuous volume is formed but the walls are prevented from separating more than a desired distance from each other by virtue of being attached to each other at the sealed points or lines. In other words, the points or lines are close enough to give an inflated heat barrier when the space between the walls is inflated, but these points and lines must not intersect in such a way as to isolate any part of the potential space between them from any other part.

The ultimate thickness of the whole heat barrier is determined by the distance between the sealed points over the common area of the two sheets, and by the pressure of the gas confined. Actually, the two sheets need not be sealed together at points, but may be sealed together by interrupted lines. The important thing is that the volume between the two sheets be continuous, but that the two sheets be prevented from separating by more than a desired distance when the confined potential volume is inflated.

Figure 2:
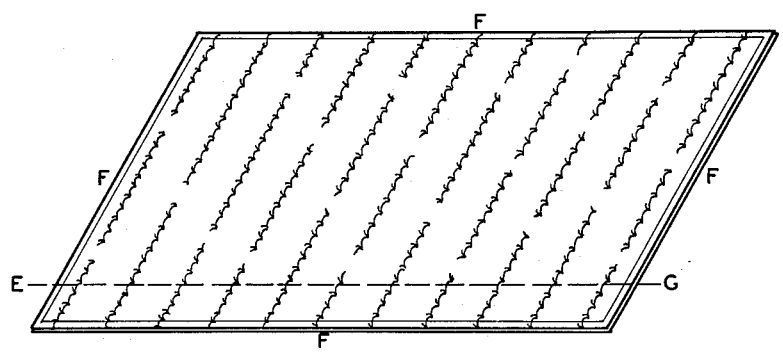
Figure 3:
Figure 4:
Figure 5:

The accompanying drawing will further clarify the physical composition of this invention. FIGURE I shows a piece of inflated heat barrier in which the two sheets forming the confined volume are sealed together at regularly spaced points. FIGURES 3 and 4 show cross-sections of this inflated sheet as it would appear if it were rigid and were cut at lines A—B and C—D respectively. FIGURE 2 shows an inflated heat barrier in which the two sheets forming the confined volume are sealed to each other by a regular pattern of interrupted lines. FIGURE 5 shows a cross section of this inflated sheet as it would appear if it were rigid and were cut at the line E—G. F in all the drawings designates the sealed edges.

Obviously, this type of package lends itself most advantageously to fabrication by a machine. Therefore, any of several procedures regarding sequence of steps, or of steps to be carried out, may be used to fabricate the package of this invention. As long as the package produced has the essential features of this invention, it is an embodiment of this invention. The method of fabrication is not intended to limit this invention in any way.

The type of construction just described pertains, of course, to a heat insulating material which is not surrounded by a confining wall. If an inflatable heat barrier is desired in which a heat insulating volume is enclosed between two rigid surfaces, the two sheets need not be sealed together except at their edges, thus allowing the confined gas to expand until all the space between the rigid walls is filled.

When the insulating material of this invention is used as a package for frozen foods, an expedient way of achieving the desired insulating effect is to introduce between the double walls of the package a liquid which has a boiling point below 32° F., preferably between −20° F. and +20° F. When the packaged item is kept in a freezer below the boiling point of the liquid, it is in the liquid state, and consequently occupies but little space. However, when it is removed from the freezer and exposed to ordinary temperatures the outer package warms up first until the liquid reaches its boiling point, whereupon it evaporates, inflating the space between the walls of the package, providing insulation against further absorption of heat by the packaged frozen food.

When the insulating material of this invention is used as a bag or package for hot foods, an expedient way of achieving the insulating effect is to inject between the walls of the package a liquid having a boiling point above 100° F. preferably between 100° F. and 120° F. When the bags or packages are not in use, they may be stored in a minimum of space, since the liquid occupies a minimum of space. However, when it is ready for use, the bag or package is placed momentarily on a surface, or in a space which is heated to a temperature above the boiling point of the liquid, causing the liquid to evaporate, inflating the space between the walls of the bag or package. The hot food is then placed in the bag and its latent heat keeps the temperature of the liquid above its boiling point, thereby keeping the bag inflated. If desired a liquid with a boiling point much lower may be used, if there is no objection to storing the bags or packages in a refrigerated space, at a temperature below the boiling point of the liquid, or if conservation of space is no object. In fact, if this latter condition exists, any gas may be used which is compatible with the materials of construction of the bag walls. Also, inflation of the bag need not be carried out before the hot food is placed in it, but may depend upon the heat provided by the hot food when it is placed in the bag.

Whenever the insulation material of this invention is desired for any application where deflation, and thus minimum volume is desired until a certain specified time not dependent upon temperature is reached, two or more materials, either liquids or solids, which chemically combine to form a gas, may be incorporated between the walls of the heat insulating material in such a way that they are physically separated until inflation is desired, whereupon they are physically mixed, causing chemical reaction, and thus producing a gas which inflates the space between the walls. For example, the reactant materials may be contained in two capsules which are crushed at the desired moment, causing chemical reaction.

Naturally, the method of using a liquid of a chosen boiling point may be used in applications other than food packages. The amount of liquid incorporated between the walls of the heat insulation material is naturally just enough to inflate the space between the walls to just the desired thickness and pressure.

Non-limiting examples of low boiling liquids which can be used in my invention, with their boiling points are: isobutane −10° C., sec-butylacetate +2.5° C., isobutylene −6° C., carbontetrafluoride −15° C., methyl chloride −24° C., methylethyl ether +10.8° C., 1-fluoropropane −3° C., 2-fluoropropane −11° C., ethyl chloride +12.5, fluorodichloromethane +14° C., 2,2-dimethylpropane +9.5° C., fluorotrichloromethane +24.9° C., difluorodichloroethylene +20.9° C., 2-methylbutane +28° C., methylformate +32° C., dichloroethylene +37° C., bromoethane +38.4° C., methylisopropyl ether +32.5° C., methyl-n-propyl ether +39° C., n-pentane +36° C.

It is not my intention to limit my invention to the materials listed here. Indeed, any material which satisfies the requirements set forth herein which has a convenient boiling point may be used, subject, of course, to other practical requirements such as low toxicity, non-corrosiveness and lack of solvency for the material of construction of the walls of the heat insulating material.

The materials for construction of the walls of the heat insulating material of this invention are preferably thermoplastic films. Examples of these are: polyamides such as nylon, polymethylmethacrylate, polyethylene, polyethylene terephthalate, vinylchloride-vinyl acetate copolymers, vinylidine chloride-vinyl chloride copolymers, cellophane, cellulose triacetate, and acrylonitrile-styrene copolymers. Materials such as metal foil to paper laminates, metal foil to plastic film laminates, metallized plastic films, etc., may also be used, provided a suitable method of sealing is used. Even certain types of paper may be used especially if it is suitably treated to reduce its permeability to gases. The scope of my invention is not intended to be limited by the materials listed here, but may be carried out using any material which allows the construction and operation of the heat insulating material described herein.

Examples of materials which chemically combine to form gases are: acetic acid and sodium bicarbonate, hydrochloric acid and sodium bicarbonate, calcium carbide and water, and calcium hydride and water.

The term "gasogenic" as employed herein relates to materials capable of forming an insulating gas capable of insulating according to this invention.

Having thus described my invention, what I claim as new and desire to obtain by Letters Patent is:

1. A heat insulating system consisting of an insulated object and a heat insulating barrier member enclosing said object, said heat insulating barrier member consisting of relatively thin sheets sealed together at their common edges and at various points over their respective areas and means for producing a gas, said means including at least two materials capable of reacting with each other, said means being between said sheets, said materials being separated prior to reacting, one of said sheets having one surface thereof facing said object and another of said sheets having one surface exposed to and facing the surroundings of the system, said object being at a temperature substantially the same as the temperature of said sheet surface facing said object and substantially different from the temperature of said sheet surface exposed to and facing the surroundings of the system.

2. The heat insulating system of claim 1 wherein said object is a food.

3. The heat insulating system of claim 1 wherein said object is a cold food.

4. The heat insulating system of claim 1 wherein said object is a hot food.

5. The heat insulating system of claim 1 wherein said insulating barrier member is an article of clothing.

References Cited in the file of this patent

UNITED STATES PATENTS

| | | |
|---|---|---|
| 1,625,810 | Krichbaum | Apr. 26, 1927 |
| 2,452,783 | Nebesar | Nov. 2, 1948 |
| 2,516,552 | Clark et al. | July 25, 1958 |
| 2,951,608 | Morrison | Sept. 6, 1960 |
| 3,024,941 | Vandenberg | Mar. 13, 1962 |